United States Patent [19]
Kosco, Jr.

[11] Patent Number: 5,775,894
[45] Date of Patent: Jul. 7, 1998

[54] COMPRESSOR BALL VALVE

[75] Inventor: John Kosco, Jr., Tecumseh, Mich.

[73] Assignee: Tecumseh Products Company, Tecumseh, Mich.

[21] Appl. No.: 743,845

[22] Filed: Nov. 5, 1996

[51] Int. Cl.$^6$ .................... F04C 18/356; F16K 15/04
[52] U.S. Cl. .................... 418/63; 418/270; 137/539; 137/856
[58] Field of Search .................... 418/63, 270; 417/569; 137/539, 855, 856

[56] References Cited

U.S. PATENT DOCUMENTS

| | | | |
|---|---|---|---|
| 640,488 | 1/1900 | Philpott | 417/569 |
| 1,582,928 | 5/1926 | Hoag | 137/539 |
| 1,652,978 | 12/1927 | Enock | 417/569 |
| 3,768,509 | 10/1973 | Goda | 137/539 |
| 4,714,416 | 12/1987 | Sano | 418/63 |
| 4,892,468 | 1/1990 | Maehara | 417/415 |
| 5,346,373 | 9/1994 | Riffe | 417/415 |
| 5,421,368 | 6/1995 | Maalouf et al. | 137/856 |

FOREIGN PATENT DOCUMENTS

| | | | |
|---|---|---|---|
| 72241 | 7/1943 | Czechoslovakia | 137/855 |
| 420256 | 10/1925 | Germany | 137/539 |
| 4-255594 | 9/1992 | Japan | 418/63 |

*Primary Examiner*—John J. Vrablik
*Attorney, Agent, or Firm*—Baker & Daniels

[57] ABSTRACT

In a refrigerant compressor, a discharge valve assembly which reduces reexpansion volume. The present invention provides a discharge valve assembly for reciprocating, rotary, and scroll types of compressors, and includes a spherical valve member that engages and penetrates a discharge port provided on a compressor cylinder head, valve plate or scroll plate. The discharge port is formed in the cylinder head or scroll plate and is dimensioned such that the spherical member penetrates and substantially fills the discharge port. The reexpansion volume within the discharge port is thereby reduced. To maintain engagement of the spherical member with the discharge port, an elastically deformable arm having an aperture is positioned to hold the spherical member in the discharge port. The arm is elastically deformable to allow the spherical valve member to move out of engagement with the discharge port during the compression phase of the compressor. To prevent the spherical member from being discharged along with the compressed refrigerant, a rigid stop plate is disposed adjacent the deformable arm to engage the spherical member during the compression phase and thereby limit the movement of the spherical valve member.

19 Claims, 2 Drawing Sheets

COMPRESSOR BALL VALVE

BACKGROUND OF THE INVENTION

1. Field of the Invention

The present invention relates to refrigerant compressors, and, more particularly, to discharge valve assemblies for refrigerant compressors.

2. Description of the Related Art

Refrigerant compressors are known of various types, such as reciprocating, rotary, and scroll. All such compressors have as a fundamental function the compressing of refrigerant fluids. Refrigerant compressors of the reciprocating piston type include at least one cylinder in which a piston reciprocatingly moves to both draw fluid into the cylinder, and compress the fluid before discharge. It is therefore necessary to provide a means for regulating the inflow and outflow of the fluid to and from the cylinder.

Rotary type refrigerant compressors include a roller or piston which rotates or orbits within a cylinder, a sliding vane divides the area defined by the rotary piston and the cylinder wall into a compression chamber and a suction chamber. The rotary piston is rotated beyond a top dead center position to a point where the compression chamber is at a maximum, and to a point just prior to the top dead center position, where the compression chamber is at a minimum. As the rotary piston is rotated beyond the top dead center position it begins to compress refrigerant fluid contained in the compression chamber. One rotary compressor is disclosed in U.S. Pat. No. 5,339,652 (Dreiman) and is incorporated herein by reference. As with the reciprocating type compressor, it is necessary to provide a means for regulating the inflow and outflow of the fluid to and from the cylinder.

To regulate the inflow and outflow of a compressed fluid in reciprocating and rotary compressor applications, a discharge valve in communication with the compression chamber is provided in a cylinder head, or in a valve plate for reciprocating type compressors, adjacent the cylinder. In reciprocating type compressors a wide variety of discharge valve types are used, including flat leaf spring type valves. Typically in a rotary compressor application a flat leaf spring type valve member is biased toward a valve seat, as the volume of fluid is compressed an increasing force is created within the compression chamber. At a certain point, the force becomes sufficient to overcome the biasing force of the leaf spring, thereby causing the valve member to become unseated and permitting compressed refrigerant fluid to enter a discharge chamber.

A problem with such valve arrangements is that they are traditionally disposed wholly external the discharge port. This results in a volume of fluid within the discharge port which is never compressed by the piston. This volume of fluid is defined by the thickness of the cylinder head or valve plate. This results in the occurrence of an undesirable re-expansion volume of fluid during each compression cycle. A valve member is needed that extends at least partially into the discharge valve port to reduce the reexpansion volume.

Valve arrangements have been devised to provide a means of regulating the outflow of the fluid from the compressor cylinder while reducing the reexpansion volume. U.S. Pat. No. 5,346,373, discloses a reciprocating type refrigeration compressor having a discharge valve poppet characterized by a spherical head which is spring biased so as to sealably seat against a valve seat which is formed in a discharge port of the compressor valve plate. A flat leaf spring and a rigid stop member bias the valve poppet toward the valve seat and limit the displacement of the valve poppet during the compression stroke, respectively. The discharge port is formed in a separate valve plate, not the cylinder head, adding expense and assembly time to the resulting compressor. Moreover, the piston includes a concaved recess to receive the spherical head, which also adds to manufacturing expense while decreasing the cylinder volume.

In rotary applications a flat leaf spring is biased toward a discharge port/valve seat provided in the cylinder head. The leaf spring is disposed over and outside of the discharge port. Although this is a simple arrangement keeping the cost of manufacturing low, it does not address the undesired effect of inefficient reexpansion volume. Again, a valve member is needed that extends at least partially into the discharge valve port to reduce the reexpansion volume.

Although the nature of a scroll type compressor does not necessitate a valve at the discharge of the compressor mechanism, enhanced noise qualities have been achieved with the use of discharge valves. One beneficial effect of utilizing discharge valves in scroll compressors is the substantial elimination of reverse orbiting which occurs upon the termination of compressor operation. Without a discharge valve, compressed fluid, at a higher pressure than the suction pressure refrigerant or partially compressed refrigerant, rushes into the orbiting scroll mechanism causing a reverse orbiting of the scroll mechanism. This creates an undesired "whizzing" noise which is preferably eliminated. Accordingly, discharge valves are also applicable in scroll applications, although for a different function than that required in reciprocating or rotary compressors.

SUMMARY OF THE INVENTION

The present invention utilizes a discharge ball valve for use in refrigerant compressors of the reciprocating, rotary and scroll types. The present ball valve addresses the above-identified needs by providing a ball valve assembly having a ball valve member which is positioned at least partially within a discharge port formed directly in a cylinder head. A separate valve plate is therefore not necessary, thus resulting in a less expensive compressor. In addition, by positioning the ball valve member within the discharge port, which is configured to most effectively receive the ball valve member, re-expansion volume is reduced, thereby enhancing compressor efficiency.

The present invention as illustrated in the drawings provides a discharge ball valve assembly for use in a rotary compressor wherein the compressor includes at least one cylinder having a rotary piston or roller rotatingly disposed therein. A discharge port, preferably having a partially chamfered or spherical shape, is formed directly in the cylinder head of the compressor so as to provide a valve seat. The discharge port/valve seat receives a spherical valve member which engages the discharge port/valve seat.

An elastically deformable arm with a cut-out, preferably circular, which engages and captures the spherical valve member such that the spherical valve member in part protrudes through the cut-out. The elastically deformable arm biases the spherical valve member into penetrating and sealing contact with the discharge port to reduce re-expansion volume. The ball valve assembly is configured such that the spherical ball member is retained in engagement with the cut-out and is prevented from becoming dislodged and discharged into the discharge chamber.

During the suction phase of the rotary piston within the cylinder, or the suction stroke in the case of a reciprocating piston, the elastic arm biases the spherical valve member into engagement with the discharge port. During the compression phase of the rotary piston, the force of the compressed refrigerant within the cylinder will at some point overcome the biasing force of the elastically deformable arm to unseat the spherical valve member from engagement with the discharge port, thereby allowing the compressed refrigerant to be discharged.

To maintain alignment of the spherical valve member with the discharge port and to prevent the spherical valve member from being displaced from its engagement with the elastic arm, a rigid stop plate is positioned adjacent the elastically deformable arm such that the spherical valve member protrudes through the elastically deformable arm at the cut-out and contacts the rigid stop plate during the compression phase. The movement of the spherical valve member is therefore limited by the rigid stop plate and the valve member is thereby retained in engagement with the cut-out.

One advantage of the present invention is that re-expansion volume within the discharge port is reduced.

Another advantage of the present invention is that the ball valve member is maintained in proper position due to the cut-out within the elastically deformable arm.

Another advantage of the present invention is that the movement of the ball valve member is limited by the rigid stop plate.

Yet another advantage of the present invention is that the discharge port/valve seat is formed directly in the cylinder head and does not necessitate the use of a separate valve plate. The present invention is therefore less expensive and easier to manufacture than prior art compressors.

The present invention, in one form thereof, provides a refrigerant compressor comprising a compressor mechanism, a discharge chamber, and a discharge valve assembly. The compressor mechanism defines a compression chamber for compressing refrigerant fluid. The discharge chamber receives compressed fluid from the compression chamber. The discharge valve assembly is disposed intermediate the compression chamber and the discharge chamber and comprises a spherical valve member, a discharge port providing a seat for the valve member, an elastically deformable arm, and a rigid stop. The spherical valve member is seated against the discharge port adjacent the discharge chamber and is dimensioned to partially penetrate and seal the discharge port, thereby reducing reexpansion volume.

The elastically deformable arm includes an aperture for partially receiving the valve member, and engages and biases the spherical valve member into engagement with the discharge port. The arm is adapted to elastically deform and thereby allow the valve member to move out of engagement with the discharge port during discharge of fluid from the compression chamber to the discharge chamber. The rigid stop is positioned over the spherical valve member and the deformable arm such that movement of the spherical valve member is limited by the rigid stop during discharge to thereby maintain alignment of the spherical valve member with the discharge port.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
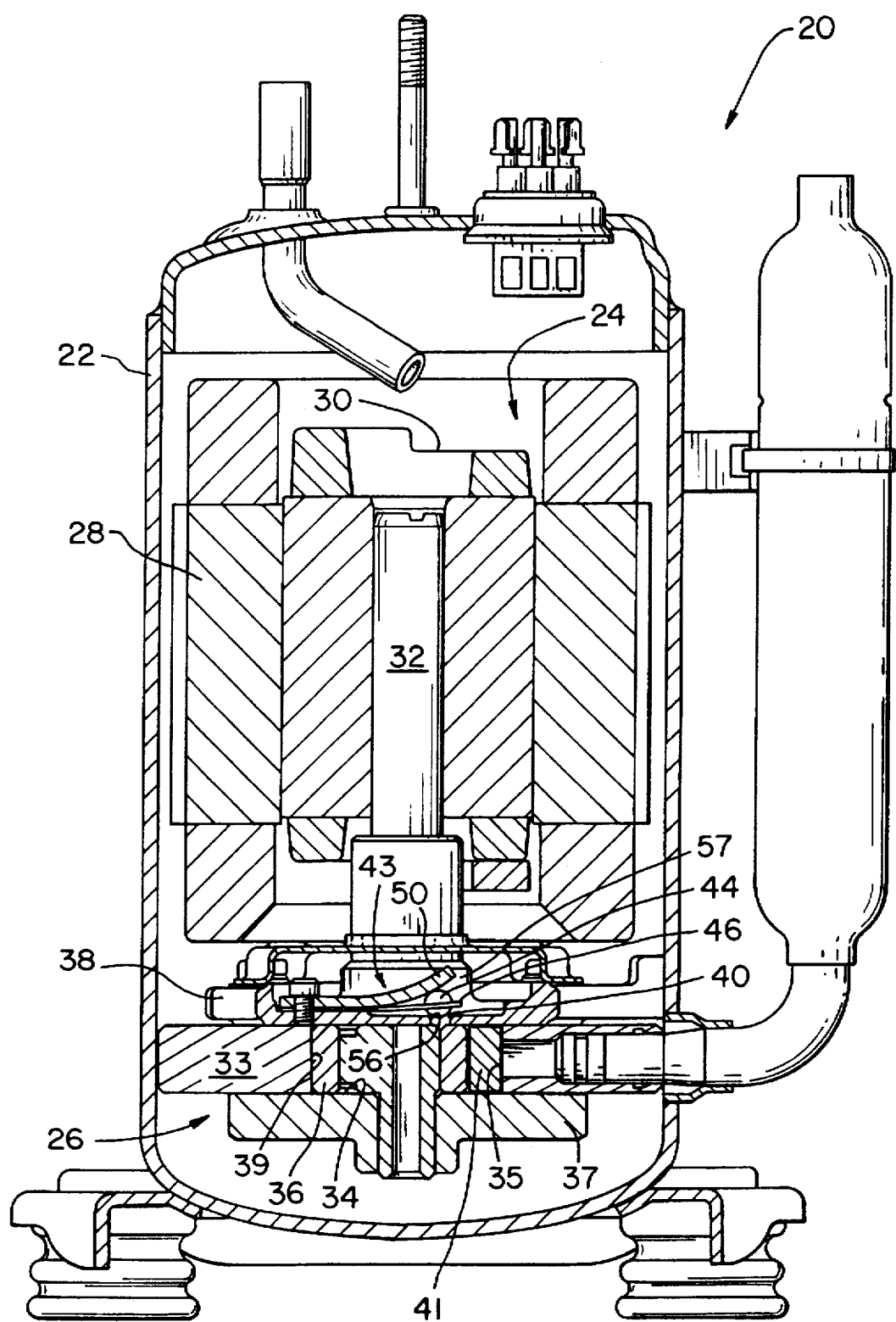
FIG. 1 is a partial sectional view of a rotary compressor incorporating the discharge ball valve assembly of the present invention.

Referring now to the drawings and particularly to FIG. 1, rotary-type refrigerant compressor 20 is shown having housing 22. Motor section 24 and compressor section 26 are disposed within housing 22. Motor section 24 includes stator 28 with rotor 30 rotatably disposed within stator 28. Shaft 32 is frictionally held within rotor 30 and extends into compressor section 26. Shaft 32 is connected to rotary piston 36 such that as shaft 32 rotates, the rotary piston, also referred to as a roller, rotates or orbits within cylinder 34 formed in cylinder block 33. In a reciprocating compressor a reciprocating type piston is used and has essentially the same function, to compress refrigerant fluid in a compression chamber, as the rotary type piston of the herein described embodiment. A sliding vane 41 is slidingly received in cylinder block 33 and slidingly extends into cylinder 34 so as to engage rotary piston 36. A spring (not shown) biases the sliding vane toward rotary piston 36 so as to maintain contact throughout compressor operation. End plate 37, cylinder head 38 and bore 39 of cylinder block 33 define cylinder 34.

Refrigerant gas at suction pressure is introduced into cylinder 34 at suction inlet 35 during a suction phase. During compression, rotary piston 36 rotates past suction inlet 35, whereby rotary piston 36, the sliding vane, cylinder bore 39, cylinder head 33 and end plate 37 form a compressor chamber. During compression, compressed fluid is discharged from the compression chamber at discharge port 40 along flow path 51.

Figure 2A:
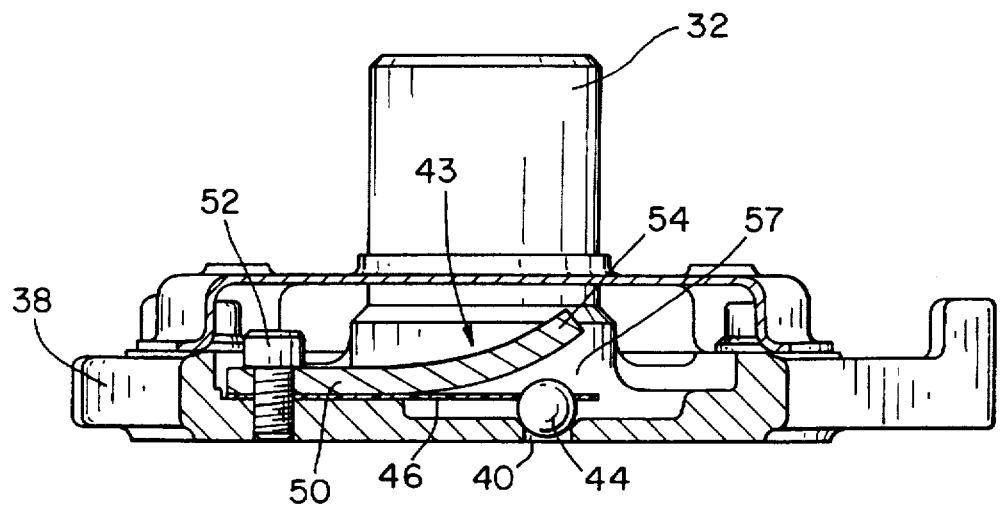
FIG. 2A is an enlarged partial sectional view of the ball valve assembly of FIG. 1 in the closed position.
Figure 2B:
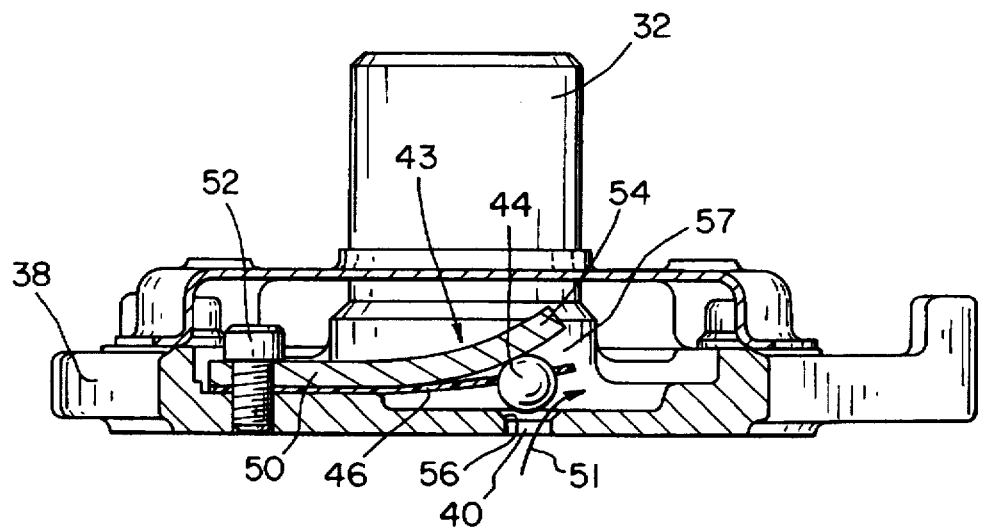
FIG. 2B is an enlarged partial sectional view of the ball valve assembly of FIG. 1 in the open position.

Referring now to FIGS. 2A and 2B, compressor section 26 is shown in further detail. Discharge port 40 is provided in cylinder head 38. To regulate fluid flow through discharge port 40, the present invention includes compressor ball valve assembly 43. Ball valve assembly 43 is comprised of spherical valve member 44, deformable arm 46, valve seat 56, and stop plate 50. Spherical valve member 44 has a diameter which is greater than the diameter of discharge port 40 and may be made of materials such as steel, powdered metal, plastic or any other suitable material. Cylinder head 38 forms discharge port 40 and chamfered valve seat 56. During periods of non-compression, spherical valve member 44 substantially penetrates into discharge port 40. In this manner, the reexpansion volume, which is the area within discharge port 40 in which gas is not compressed, is reduced.

Figure 3:
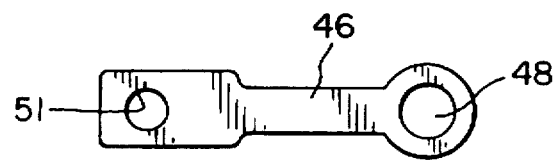
FIG. 3 is a plan view of the deformable arm of the ball valve assembly of FIG. 1.

To maintain engagement of spherical valve member 44 with discharge valve seat 56, the present invention includes elastically deformable arm 46. As best shown in FIG. 3, elastically deformable arm 46, conventionally a flat leaf spring, has a generally planar surface which is provided with an aperture 48, which is preferably circular. Circular aperture 48 has a diameter smaller than the diameter of spherical valve member 44 such that at least part of the valve member, up to but not more than half, penetrates circular aperture 48 as shown in FIGS. 2A and 2B. Elastically deformable arm 46 functions like a flapper valve and may be constructed of materials including leaf spring steel, or plastic such as heat resistant nylon. Spherical valve member 44 is biased into engagement with discharge valve seat 56 as best shown in FIG. 2A.

During the suction phase of rotary piston 36, spherical valve member 44 will be normally biased into engagement with chamfered discharge valve seat 52 by elastically deformable arm 46, thereby preventing fluid from being drawn from discharge chamber 42 into cylinder 34. However, during the compression phase of rotary piston 36, the compressed refrigerant within cylinder 34 will act to overcome the biasing force of elastically deformable arm 46 to move spherical valve member 44 away from valve seat 56, thereby deforming arm 46 to the position shown in FIG. 2B. With spherical valve member 44 unseated from valve seat 56, refrigerant exits cylinder 34 along flow path 51 into discharge chamber 57. After the compression phase, the biasing force of deformable arm 46 will again return deformable arm 46 to the position shown in FIG. 2A and place sphere 44 in sealing engagement with discharge valve seat 56.

Stop plate 50 is provided adjacent to and limits the movement of spherical valve member 44 and thereby maintains engagement of the valve member with arm 46 at circular aperture 48 and alignment of the valve member with discharge port 40. As best shown in FIGS. 2A and 2B, stop plate 50 is a rigid arcuate member which curves away from deformable arm 46. During the compression phase of rotary piston 36 within cylinder 34, the portion of spherical valve member 44 penetrating circular aperture 48 contacts stop plate 50 at arcuate end 54 and is thereby limited in motion. Because spherical valve member 44 engages circular aperture 48 of deformable arm 46, and is limited in movement by arcuate end 54 of stop plate 50, the spherical valve member will not be discharged along with the compressed fluid into discharge chamber 57.

Also shown in FIGS. 2A and 2B, stop plate 50 and deformable arm 46 are secured to cylinder head 38 via bolt 52 in the exemplary embodiment. However, other fastening mechanisms for attaching stop plate 50 and deformable arm 46 to cylinder head 38 are known and fully contemplated by the present invention. Deformable arm 46 is provided with bolt aperture 51 as shown in FIG. 3 to allow bolt 52 to pass therethrough.

As best shown in FIG. 2A, the dimensions of spherical valve member 44 and discharge port 40 are such that the valve member substantially fills discharge port 40. Preferably the valve seat and valve member are designed in a complimentary manner so that the valve member most effectively fills the discharge port to limit reexpansion volume. The reexpansion volume within discharge port 40 is thereby reduced, and the overall efficiency of the compressor is enhanced.

Although the present invention has been described and illustrated primarily in a rotary compressor application, it should be understood that the invention has broad based application in other types of compressors, such as reciprocating and scroll type compressors. In scroll type compressors, a scroll set serves as the compressor mechanism for compressing refrigerant fluid. The scroll set includes an orbiting scroll member which orbits relative a fixed scroll member so as to create pockets of compressed refrigerant fluid. The compressed refrigerant fluid is discharged through a discharge port provided in an end plate in one of the members of the scroll set. Although scroll type compressors do not require the use of discharge valves, the ball valve assembly of the present invention may be incorporated at the discharge port of a scroll compressor to reduce noise and to prevent reverse orbital movement upon compressor shut down.

While this invention has been described as having a particular design, the present invention can be further modified within the spirit and scope of this disclosure. This application is therefore intended to cover any variations, uses, or adaptations of the invention using its general principles, and further this application is intended to cover such departures from the present disclosure as come within known or customary practice in the art to which this invention pertains, and which fall within the limits of the appended claims.

What is claimed is:

1. A refrigerant compressor, comprising:
a compressor mechanism defining a compression chamber for compressing refrigerant fluid;
a discharge chamber receiving compressed refrigerant fluid from said compression chamber; and
a discharge valve assembly disposed intermediate said compression chamber and said discharge chamber, said discharge valve assembly comprising:
a discharge port;
a spherical valve member seated against said discharge port, said spherical valve member dimensioned to partially penetrate and seal said discharge port;
an elastically deformable arm having an aperture partially receiving said spherical valve member therein, said arm engaging said spherical valve member and biasing said spherical valve member into engagement with said discharge port, said arm adapted to deform and thereby allow said spherical valve member to move out of engagement with said discharge port during a compression phase; and
a rigid stop disposed adjacent said spherical valve member and said arm, and limiting the movement of said spherical valve member during the compression phase, thereby maintaining alignment of said spherical valve member with said discharge port.

2. The compressor of claim 1, wherein said arm aperture is a circular cut-out.

3. The compressor of claim 1, wherein said deformable arm is manufactured from spring steel.

4. The compressor of claim 1, wherein said deformable arm is manufactured from heat resistant plastic.

5. The compressor of claim 1, wherein said deformable arm has a substantially planar surface, and said rigid stop is a rigid plate having an arcuate surface.

6. The compressor of claim 5, wherein said compressor mechanism comprises a cylinder head, and wherein said deformable arm and said rigid plate are fastened to said cylinder head, said arm and said plate being in contact where said arm and said plate are fastened to said cylinder head, said arcuate rigid plate curving away from said deformable arm proximate said spherical valve member.

7. The compressor of claim 1, wherein said discharge port is chamfered at a surface adjacent said discharge chamber to provide a seat for said spherical valve member.

8. In a refrigerant compressor comprising a compressor mechanism having a cylinder receiving a piston, a discharge chamber receiving compressed refrigerant fluid, and a cylinder head having a discharge port formed therethrough, said cylinder and said cylinder head defining a compression chamber, said discharge port providing fluid communication between said compression chamber and said discharge chamber, a discharge valve assembly comprising:

a spherical valve member seated against said discharge port and adjacent said discharge chamber, said valve member dimensioned to partially penetrate and seal said discharge port;

an elastically deformable arm having an aperture partially receiving said spherical valve member therein, said arm engaging said spherical valve member and biasing said spherical valve member into engagement with said discharge port, said arm adapted to deform and thereby allow said spherical valve member to move out of engagement with said discharge port during a compression phase; and a rigid stop disposed adjacent said spherical valve member and said arm, and limiting the movement of said spherical valve member during the compression phase, thereby maintaining alignment of said spherical valve member with said discharge port.

9. The compressor of claim 8, wherein said deformable arm is manufactured from spring steel.

10. The compressor of claim 8, wherein said deformable arm is manufactured from heat resistant plastic.

11. The compressor of claim 8, wherein said deformable arm has a substantially planar surface, and said rigid stop is a rigid plate having an arcuate surface.

12. The compressor of claim 11, wherein said deformable arm and said rigid plate are fastened to said cylinder head, said arm and said plate being in contact where said arm and said plate are fastened to said cylinder head, said arcuate rigid plate curving away from said deformable arm proximate said spherical valve member.

13. The compressor of claim 8, wherein said discharge port has a chamfered surface adjacent said discharge chamber to provide a seat for said spherical valve member.

14. In a rotary refrigerant compressor comprising a cylinder block having a bore defining a cylinder, a rotary piston received in said cylinder, a vane slidingly received in said cylinder block and engaging said piston, a cylinder head having a discharge port formed therethrough and defining a discharge chamber for receiving compressed refrigerant fluid, said cylinder, said vane, said piston, and said cylinder head defining a compression chamber, said discharge port providing fluid communication between said compression chamber and said discharge chamber, a discharge valve assembly comprising:

a spherical valve member seated against said discharge port and adjacent said discharge chamber, said valve member dimensioned to partially penetrate and seal said discharge port;

an elastically deformable arm having an aperture partially receiving said spherical valve member therein, said arm engaging said spherical valve member and biasing said spherical valve member into engagement with said discharge port, said arm adapted to deform and thereby allow said spherical valve member to move out of engagement with said discharge port during a compression phase; and a rigid stop disposed adjacent said spherical valve member and said arm, and limiting the movement of said spherical valve member during the compression phase, thereby maintaining alignment of said spherical valve member with said discharge port.

15. The rotary compressor of claim 14, wherein said deformable arm is manufactured from spring steel.

16. The rotary compressor of claim 14, wherein said deformable arm is manufactured from heat resistant plastic.

17. The rotary compressor of claim 14, wherein said deformable arm has a substantially planar surface, and said rigid stop is a rigid plate having an arcuate surface.

18. The rotary compressor of claim 17, wherein said deformable arm and said rigid plate are fastened to said cylinder head, said arm and said rigid plate being in contact where said arm and said rigid plate are fastened to said cylinder head, said arcuate rigid plate curving away from said deformable arm proximate said spherical valve member.

19. The rotary compressor of claim 14, wherein said discharge port has a chamfered surface adjacent said discharge chamber to provide a seat for said spherical valve member.

* * * * *